US012009146B2

(12) United States Patent
Nabih et al.

(10) Patent No.: US 12,009,146 B2
(45) Date of Patent: Jun. 11, 2024

(54) MAGNETIC INTEGRATION OF MATRIX TRANSFORMER WITH CONTROLLABLE LEAKAGE INDUCTANCE

(71) Applicant: Virginia Tech Intellectual Properties, Inc., Blacksburg, VA (US)

(72) Inventors: Ahmed Nabih, Blacksburg, VA (US); Qiang Li, Blacksburg, VA (US); Fred C. Lee, Blacksburg, VA (US)

(73) Assignee: Virginia Tech Intellectual Properties, Inc., Blacksburg, VA (US)

( * ) Notice: Subject to any disclaimer, the term of this patent is extended or adjusted under 35 U.S.C. 154(b) by 514 days.

(21) Appl. No.: 16/864,868

(22) Filed: May 1, 2020

(65) Prior Publication Data

US 2020/0350117 A1 Nov. 5, 2020

Related U.S. Application Data

(60) Provisional application No. 62/842,089, filed on May 2, 2019.

(51) Int. Cl.
*H01F 27/24* (2006.01)
*H01F 27/28* (2006.01)
(Continued)

(52) U.S. Cl.
CPC .......... *H01F 27/346* (2013.01); *H01F 27/24* (2013.01); *H01F 27/2804* (2013.01);
(Continued)

(58) Field of Classification Search
CPC .... H01F 27/346; H01F 27/24; H01F 27/2804; H01F 27/34; H01F 30/04;
(Continued)

(56) References Cited

U.S. PATENT DOCUMENTS 5,126,714 A * 6/1992 Johnson ................. H01F 19/04
336/200
5,497,310 A * 3/1996 Noda ..................... H05B 41/24
323/250

(Continued)

FOREIGN PATENT DOCUMENTS

CN 101840769 9/2010
EP 2230673 A2 3/2010

OTHER PUBLICATIONS

Ahmed et al., Low-Loss Integrated Inductor and Transformer Structure and Application in Regulated LLC Converter for 48-V Bus Converter, IEEE Journal of Emerging and Selected Topics in Power Electronics, vol. 8, No. 1, p. 589-600, 2020.

(Continued)

*Primary Examiner* — Mang Tin Bik Lian
(74) *Attorney, Agent, or Firm* — Thomas | Horstemeyer, LLP

(57) ABSTRACT

Various examples of magnetic integration of matrix transformers with controllable leakage inductance are described. In one example, a transformer includes a magnetic core comprising a plurality of core legs and a leakage core leg. The leakage core leg is positioned among the plurality of core legs to control a leakage inductance of the transformer. The transformer also includes a planar winding structure. The planar winding structure includes a primary winding and a plurality of secondary windings. The primary winding and the plurality of secondary windings extend in a number of turns around the plurality of core legs, without a turn around the leakage core leg, to further control the leakage inductance of the matrix transformer.

20 Claims, 13 Drawing Sheets

(51) Int. Cl.
*H01F 27/34* (2006.01)
*H01F 30/04* (2006.01)
*H01F 38/02* (2006.01)

(52) U.S. Cl.
CPC ............. *H01F 27/34* (2013.01); *H01F 30/04* (2013.01); *H01F 2027/2819* (2013.01); *H01F 2038/026* (2013.01)

(58) Field of Classification Search
CPC ....... H01F 2027/2819; H01F 2038/026; H01F 27/40; H01F 38/00; H01F 2027/408; H01F 2038/006; H01F 3/12; H01F 3/14; H01F 2027/2809; H02M 1/0058; H02M 3/285; H02M 3/33592; Y02B 70/10
See application file for complete search history.

(56) References Cited

U.S. PATENT DOCUMENTS

| | | | |
|---|---|---|---|
| 10,186,974 B2 | 1/2019 | Yang et al. | |
| 2003/0198067 A1* | 10/2003 | Sun | H01F 30/06 363/53 |
| 2005/0151614 A1* | 7/2005 | Dadafshar | H01F 27/255 336/223 |
| 2010/0321960 A1* | 12/2010 | Nakahori | H01F 27/2847 363/21.04 |
| 2016/0254756 A1 | 9/2016 | Yang et al. | |
| 2017/0310228 A1* | 10/2017 | Nakajima | H01F 27/24 |
| 2017/0330678 A1* | 11/2017 | Harrison | H01F 3/10 |
| 2018/0025828 A1* | 1/2018 | Nakajima | H02M 3/33507 363/17 |
| 2018/0138801 A1* | 5/2018 | Chen | H01F 27/40 |
| 2018/0278174 A1* | 9/2018 | Chen | H01F 27/306 |
| 2019/0043660 A1* | 2/2019 | Jin | H01F 27/24 |

OTHER PUBLICATIONS

Ahmed et al., High-efficiency, High-density Isolated/Regulated 48V Bus Converter with a Novel Planar Magnetic Structure, IEEE, p. 468-475, 2019.
Fei et al., High-Efficiency High-Power-Density LLC Converter With an Integrated Planar Matrix Transformer for High-Output Current Applications, IEEE Transactions on Industrial Electronics, vol. 64, No. 11, p. 9072-9082, 2017.
Huang et al., LLC Resonant Converter with Matrix Transformer, IEEE Trans. Power Electron., vol. 29, No. 8, p. 4339-4347, 2014.
Huang et al., High-Frequency High-Efficiency CLL Resonant Converters With Synchronous Rectifiers, IEEE Transactions on Industrial Electronics, vol. 58, No. 8, p. 3461-3470, 2011.
Yang et al., Integrated magnetic for LLC resonant converter, Proc. 17th Annu. IEEE Appl. Power Electron. Conf. Expo., p. 346-351, 2002.
Yan et al., F, A novel transformer structure for high power high frequency converter, Proc. IEEE Power Electron. Spec. Conf., p. 940-947, 2007, p. 214-218.
Herbert, Design and application of matrix transformers and symmetrical converters, presented at the High Frequency Power Convers. Conf., Santa Clara, CA, USA, May 1990.
Ngo et al., Modeling of Magnetizing Inductance and Leakage Inductance in a Matrix Transformer, IEEE Transactions on Power Electronics, vol. 8, No. 2, p. 200-207, 1993.
Ngo et al., Modeling of Losses in a Sandwiched-Winding Matrix Transformer, IEEE Transactions on Power Electronics, vol. IO, No. 4, p. 427-434, 1995.
Li et al., Google 48V Power Architecture, Mar. 27, 2017.

* cited by examiner

MAGNETIC INTEGRATION OF MATRIX TRANSFORMER WITH CONTROLLABLE LEAKAGE INDUCTANCE

CROSS-REFERENCE TO RELATED APPLICATION

This application claims the benefit of and priority to U.S. Provisional Application No. 62/842,089, titled "MAGNETIC INTEGRATION OF MATRIX TRANSFORMER WITH HIGH CONTROLLABLE LEAKAGE INDUCTANCE," filed on May 2, 2019, the entire contents of which are hereby incorporated herein by reference.

BACKGROUND

Power conversion is related to the conversion of electric power or energy from one form to another. Power conversion can involve converting between alternating current (AC) and direct current (DC) forms of energy, AC to AC forms, DC to DC forms, changing the voltage, current, or frequency of energy, or changing some other aspect of energy from one form to another. In that context, a power converter is an electrical or electro-mechanical device for converting electrical energy. A transformer is one example of a power converter, although more complicated systems, including complex arrangements of diodes, synchronous rectifiers, switching transistors, transformers, and control loops, can be used.

BRIEF DESCRIPTION OF THE DRAWINGS

Many aspects of the present disclosure can be better understood with reference to the following drawings. The components in the drawings are not necessarily drawn to scale, with emphasis instead being placed upon clearly illustrating the principles of the disclosure. In the drawings, like reference numerals designate corresponding parts throughout the several views.

DETAILED DESCRIPTION

As noted above, power conversion is related to the conversion of electric power or energy from one form to another. Power conversion can involve converting between alternating current (AC) and direct current (DC) forms of energy, AC to AC forms, DC to DC forms, changing the voltage, current, or frequency of energy, or changing some other aspect of energy from one form to another. In that context, a power converter is an electrical or electro-mechanical device for converting electrical energy. A transformer is one example of a power converter, although more complicated systems, including complex arrangements of diodes, synchronous rectifiers, switching transistors, transformers, and control loops, can be used.

In the context of power converters, isolated DC-DC converters have numerous uses in many applications such as in datacenters, photovoltaic (PV) applications, and electric vehicles. In most applications, high efficiency and high power density are important targets. As an example, resonant converters represent an efficient solution for DC-DC converters. Resonant converters feature soft switching, and the switching frequency can be tailored to achieve high efficiency. In some resonant power converter circuits, including in three-element LLC resonant power converters, a transformer with series inductance is relied upon as an important element in the resonant circuit.

Magnetic loss in a DC-DC converter, including losses due to transformers and inductors, is often associated with a significant portion of the overall inefficiency and size of the converter. Therefore, improving the magnetic structure can help to improve the overall performance of power converters. In high power resonant converters, the secondary side winding loss and secondary rectifier (SR) devices loss become significant. Therefore, a matrix of transformers can be used with a series primary and parallel secondary sides. In a matrix transformer, each elemental transformer handles a fraction of the power and the secondary side losses are reduced.

In the context outlined above, various examples of magnetic integration of matrix transformers with controllable leakage inductance are described herein. In one example, a transformer includes a magnetic core comprising a plurality of core legs and a leakage core leg. The leakage core leg is positioned among the plurality of core legs to control a leakage inductance of the transformer. The transformer also includes a planar winding structure. The planar winding structure includes a primary winding and a plurality of secondary windings. The primary winding and the plurality of secondary windings extend in a number of turns around the plurality of core legs, without a turn around the leakage core leg, to further control the leakage inductance of the matrix transformer.

Figure 1:
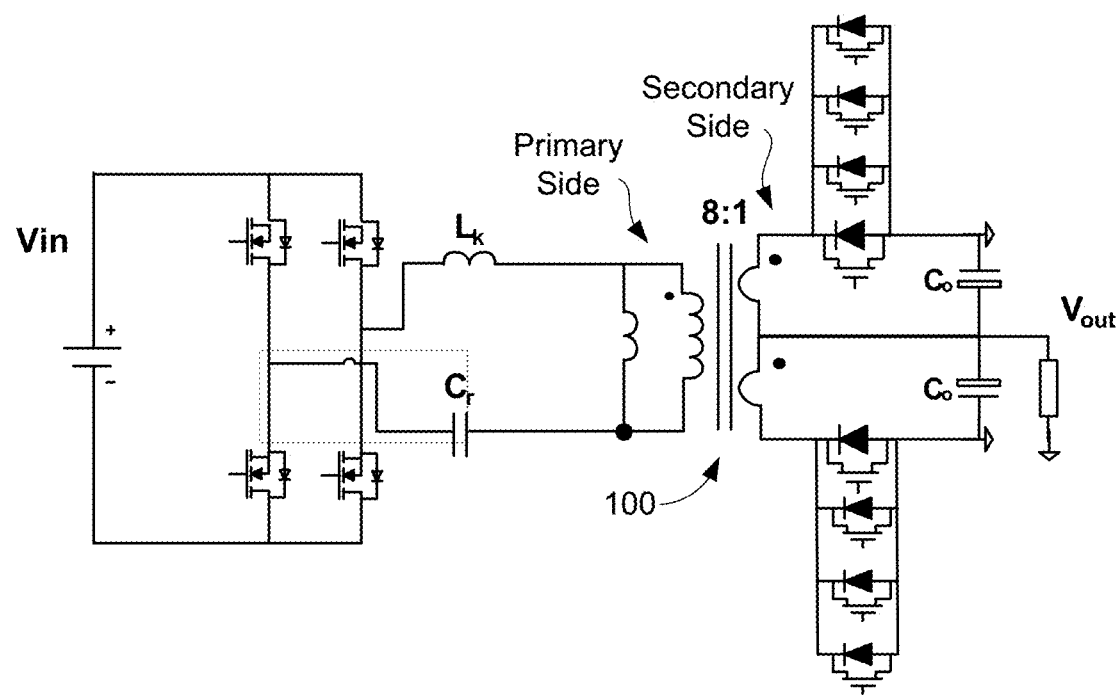
FIG. 1 illustrates an example resonant power converter including a transformer with parallel synchronous rectifiers (SRs) according to various embodiments described herein.

Shown in FIG. 1 is a resonant power converter including a single transformer 100 with parallel SR devices on the secondary side. In this example, at least four parallel SR devices are needed on each side of the secondary, which includes a center tap. A relatively high current density is relied upon in the secondary. The current sharing is relatively poor and there is high termination loss and high conduction loss. To improve on these limitations, the transformer 100 can be replaced or reconfigured with a number of elemental transformers. The elemental transformers are scalable corresponding to the configuration of the single transformer 100.

Figure 2:
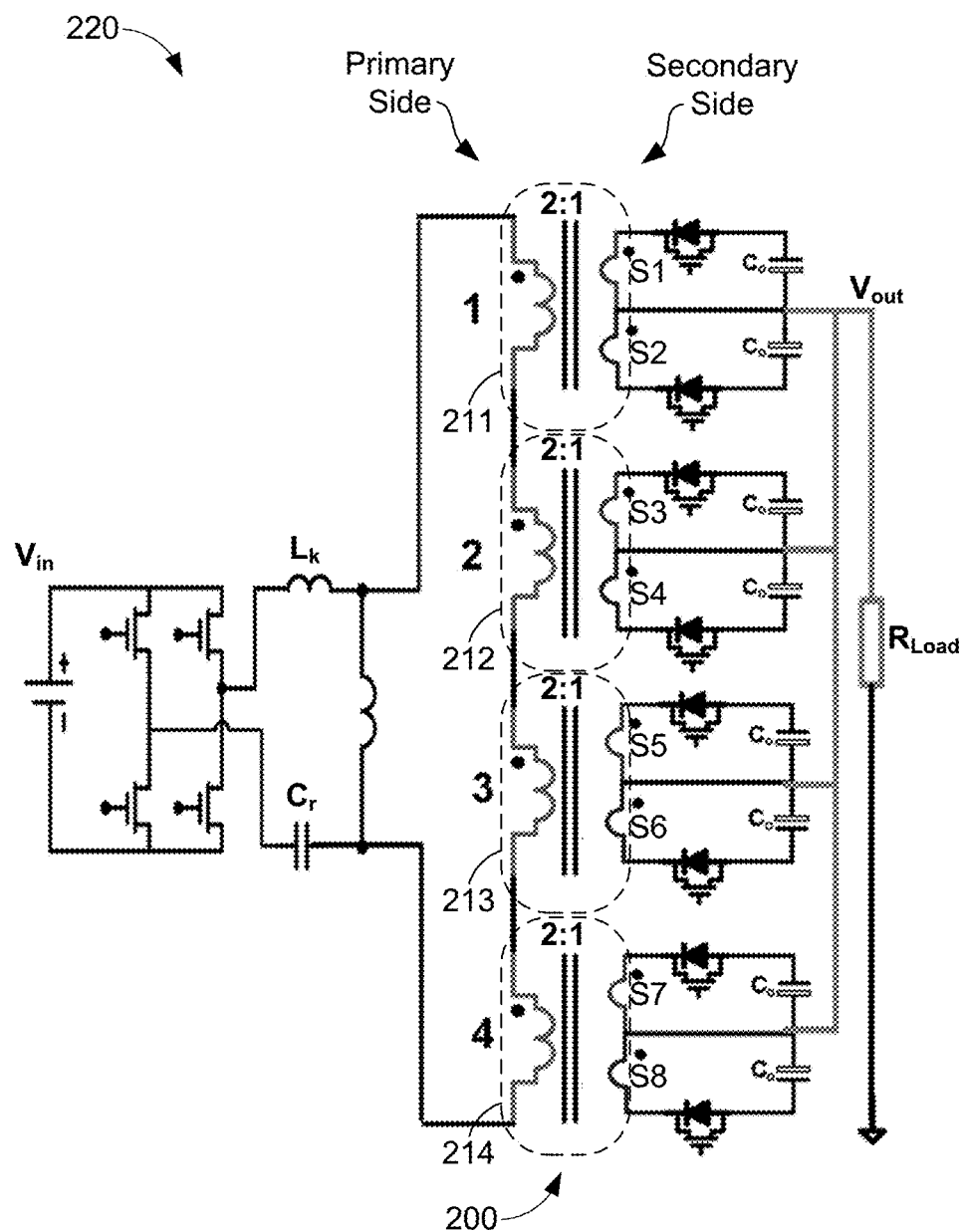
FIG. 2 illustrates an example of a resonant power converter including a matrix of four elemental transformers according to various embodiments described herein.

For example, the single transformer 100 shown in FIG. 1 can be replaced with a matrix transformer including a number of elemental transformers. FIG. 2 illustrates an example of a resonant power converter 200 including a matrix transformer 200. The power converter 220 includes a primary phase leg on the primary side of the matrix transformer 200 and a number of secondary phase legs on the secondary side of the matrix transformer 200. The power converter 220 shown in FIG. 2 includes four secondary phase legs, although any suitable number of secondary phase legs can be relied upon in other examples. The primary phase leg of the power converter 220 includes a full bridge configuration of switching transistors. Each secondary phase leg of the power converter 220 includes a pair of SR devices, positioned on alternate sides of a center tap in the secondary side winding of the secondary phase leg. The configuration of the power converter 220 is provided as a representative example in FIG. 2, and the matrix transformer 200 can be implemented and relied upon in other types and configurations of power converters.

As shown in FIG. 2, the matrix transformer 200 includes elemental transformers 211-214. The primary side winding of each elemental transformer 211-214 is arranged in series. The secondary side winding of each elemental transformer 211-214 is divided or separated into two parts by a center tap. One half of each secondary side winding can be referenced as secondary A, and the other half of each secondary side winding can be referenced as secondary B. In operation, the secondary A winding of each elemental transformer 211-214 conducts during a first-half cycle, and the secondary B winding of each elemental transformer 211-214 conducts during a second-half cycle. Each of the elemental transformers 211-214 includes a number of primary windings and a number of secondary windings, to provide a specified turns ratio.

In the example shown in FIG. 2, the primary side windings are arranged in series among the elemental transformers 211-214, with two turns of the primary side winding for each elemental transformer 211-214. The secondary side winding of each elemental transformer 211-214 has one turn in secondary A and one turn in secondary B. Using matrix transformer 200, it is not necessary to couple the SR devices in parallel. Instead, power is divided among the four elemental transformers 211-214 and the secondary phase legs of the power converter 220. For example, as compared to the turns ratio of 8:1 in the single transformer 100 shown in FIG. 1, each elemental transformer 211-214 in FIG. 2 can have a turns ratio of 2:1.

The windings S1 and S2 are on the secondary side of elemental transformer 211, for one secondary phase leg of the power converter 220. In operation, S2 conducts current in a first half-cycle and S1 conducts current in a second half-cycle of the power converter 220. Similarly, S4, S6, and S8 operate in the first half-cycle and S3, S5, and S7 operate in the second half-cycle. Also, each of S1-S8 include a series-connected SR and capacitor (C). While this example illustrates four elemental transformers, each with a center-tap secondary winding, secondary windings without center taps can also be used.

As described in further detail below, the elemental transformers 211-214 of the matrix transformer 200 can be integrated into a single magnetic core. The elemental transformers 211-214 can be implemented as four transformers integrated into a four leg core, each with primary and secondary windings. This results in less termination loss and low secondary winding loss. In various examples, four transformers with series primary and parallel secondary windings can be integrated in one core, where the flux in one core leg is in opposite direction to the flux in the leg next to it. This integration method reduces the size and reduces the core loss in the transformer. In one example, a magnetic core with four legs can be used, and the windings can be reduced such that only a four-layer printed circuit board (PCB) is needed.

The core legs in the integrated matrix of four transformers can be located at or near the corners of a square-shaped core, with a winding layout implemented using a four-layer PCB. The windings are configured to divide and distribute the flux density to reduce core loss. In one example configuration, the primary windings are positioned as the middle two layers in the four-layer PCB, and the secondary windings are positioned on the top and bottom layers in the four-layer PCB. While this integration reduces to a single core, the resulting flux distribution in the core is underutilized at the center area between the four elemental transformers. Similarly, a simulation of the secondary winding current also shows underutilization of the center area between the four elemental transformers.

In one integrated matrix transformer described herein, the winding arrangements for all transformers are symmetrical, and the magnetizing inductance can be controlled by controlling the air gap. However, the transformer has very small leakage inductance. In some applications, a high inductance value is needed in series with the transformer windings, such as in a regulated LLC power converter. A series inductor can be implemented along with the matrix transformer by utilizing the primary winding to wrap around an additional core to create a relatively high leakage inductance, which serves as a series inductor to the primary transformer. The extra inductance can be added using the primary winding. In this method, an extra core can be used to confine the leakage flux and control the leakage inductance, for example, by adding legs 5 and 6 next to legs 1 and 3. The leakage flux circulates between legs 5 and 6. However, with this method of inductor integration, the inductor takes an additional space for the magnetic size and compromises the power density of the magnetic structure.

In the context of matrix transformers, various examples related to the magnetic integration of matrix transformers with high controllable leakage inductance are described below. A new approach is described to integrate a highly-controllable leakage inductance with a matrix of four or more transformers using one magnetic core. The center space between the four transformer legs can be utilized in one example to create the controllable leakage inductance using only one extra core leg. The extra leg can be utilized for the leakage flux, and the leakage flux return path can flow through the other four transformer legs.

For example, a matrix transformer can include a five-leg magnetic core, where four legs are utilized for four elemental transformers and a fifth leg, referenced as a leakage leg or center leg, is placed at the center between the four transformer legs to create a controllable leakage inductance without sacrificing the power density of the magnetic structure. In some examples, the secondary windings of the matrix transformers can be relocated to create leakage flux in the center leg. Different winding arrangements can also be used to create different leakage inductances on the secondary or primary sides. The leakage inductance can also be controlled by controlling the cross-sectional area and air gap of the center leg. Although a five-leg magnetic core is described herein, the concepts can be extended by adding pairs of transformer legs with additional corresponding leg(s) for leakage inductance. In some examples, the leakage leg can be configured to comprise multiple portions distributed spatially to control the leakage inductance.

Figure 3:
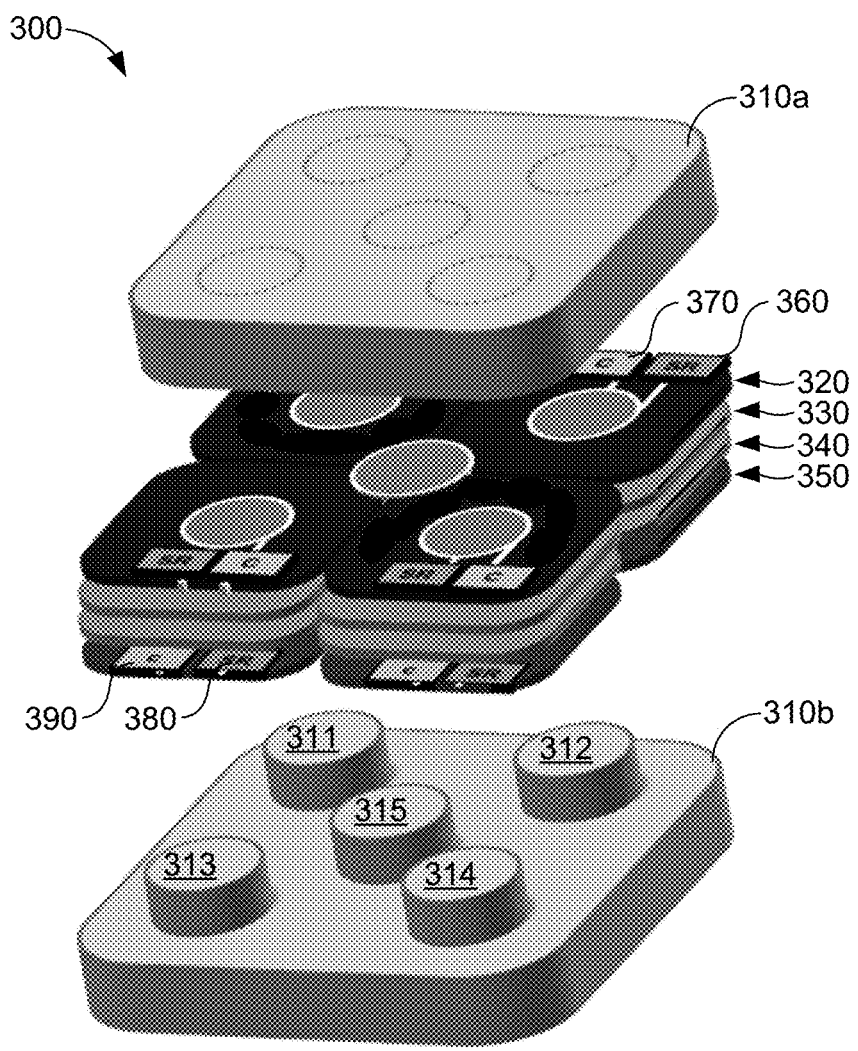
FIG. 3 illustrates an integrated matrix transformer 300 including a five-leg core with a four layer winding structure according to various embodiments described herein.

FIG. 3 illustrates an integrated matrix transformer 300 including a five-leg magnetic core and a four-layer winding structure according to various embodiments described herein. The magnetic core includes a first portion 310a and a second portion 310b, which can be separable as shown. The second portion 310b includes a number of core legs. As shown, the second portion 310b includes four core legs 311-314, corresponding to four elemental transformers of the integrated matrix transformer 300. The four core legs 311-314 are located toward the corners of the second portion 310b of the magnetic core, which is square in shape. The flux distribution and leakage inductance of the integrated matrix transformer 300 can be controlled, in part, by the addition of the leakage leg 315 as described below. The four-layer winding structure includes a planar winding structure of winding layers 320, 330, 340, and 350. The winding layers 320, 330, 340, and 350 can be embodied as a four-layer PCB board in one example.

The four elemental transformers of the integrated matrix transformer 300 can be relied upon as the elemental transformers 211-214 of the power converter 220 shown in FIG. 2. As described in further detail below, the integrated matrix transformer 300 includes primary and secondary windings positioned to extend around the four core legs 311-314. The windings can be positioned and configured such that the four core legs 311-314 have similar flux densities, and the direction of flux varies (e.g., is opposite) in adjacent core legs for a better distribution of flux density in the integrated matrix transformer 300. In this context, the core legs 311 and 312 are adjacent to each other, the core legs 312 and 314 are adjacent to each other, the core legs 314 and 313 are adjacent to each other, and the core legs 313 and 311 are adjacent to each other. The core legs 311 and 314 are opposite or diagonal to each other, and core legs 313 and 312 are opposite or diagonal to each other.

In the embodiment shown in FIG. 3, the four-layer winding structure is configured with the primary winding layers 330 and 340 positioned as the middle layers. The secondary winding layers 320 and 350 are positioned as the top and bottom layers, respectively, with the primary winding layers 330 and 340 positioned between the secondary winding layers 320 and 350. In the configuration shown in FIG. 3, the top secondary winding layer 320 is the secondary A layer, operating in the first half-cycle. When incorporated into the power converter 220 shown in FIG. 2, for example, the secondary winding layer 320 can be relied upon for the S1, S3, S5, and S7 windings. The bottom secondary winding layer 350 is the secondary B layer, operating in the second half-cycle. When incorporated into the power converter 220 shown in FIG. 2, the secondary winding layer 350 can be relied upon for the S2, S4, S6, and S8 windings. To implement the secondary-side circuit arrangement shown in FIG. 2, a number of SRs and capacitors can be directly mounted to the secondary winding layer 320 and the secondary winding layer 350 as shown in FIG. 3. Among others, FIG. 3 illustrates SRs 360 and 380 and capacitors 370 and 390.

Figure 4:
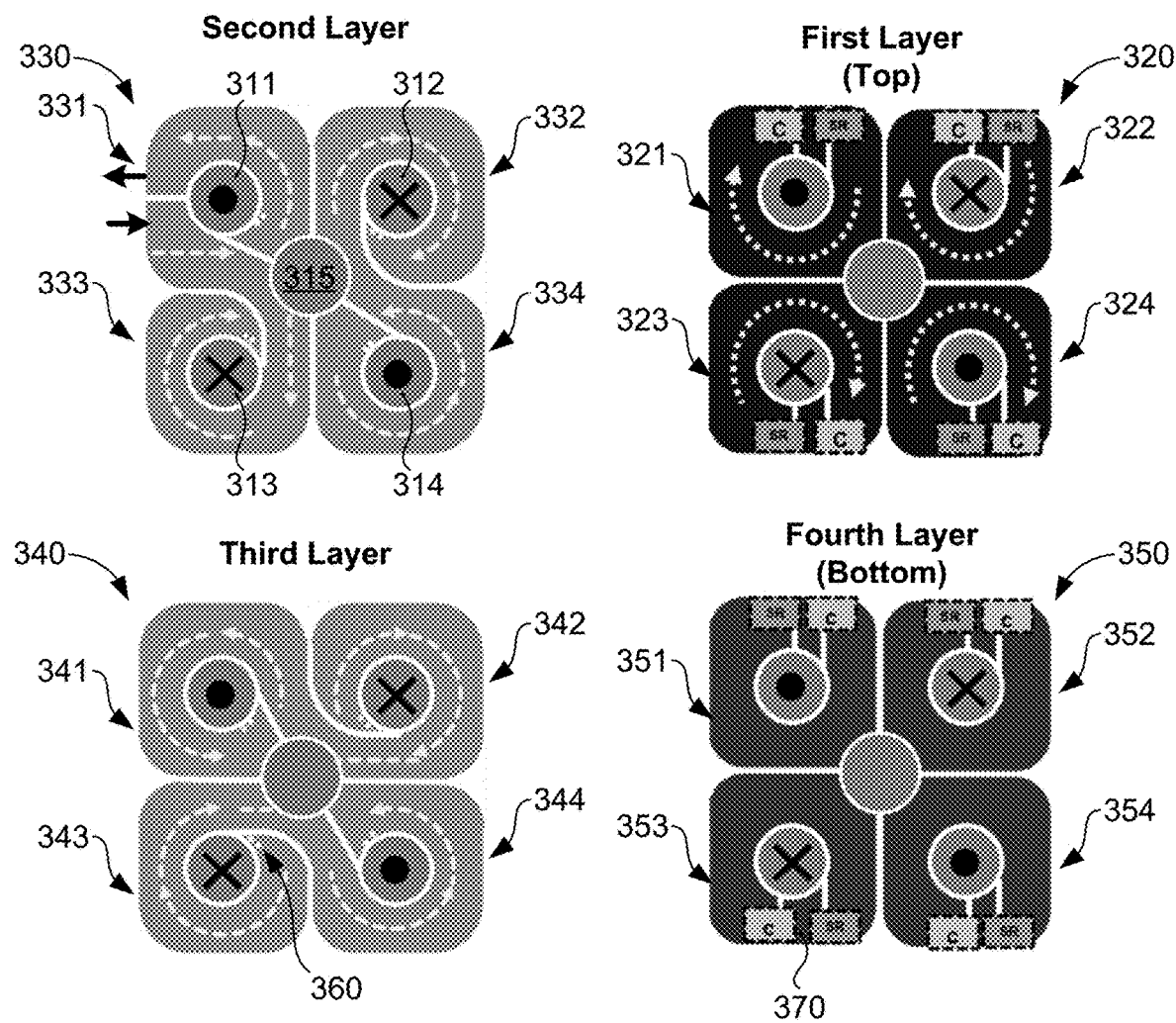
FIG. 4 illustrates an example winding arrangement of the integrated matrix transformer shown in FIG. 3 according to various embodiments described herein.

FIG. 4 illustrates an example of the winding arrangement of the integrated matrix transformer 300 shown in FIG. 3 according to various embodiments described herein. The matrix transformer 300 includes four elemental transformers as described above, implemented as a five-leg magnetic core and a four-layer winding structure. A number of windings in the winding layers 320, 330, 340, and 350 extend, wrap, or turn around the four core legs 311-314 as shown in FIG. 4. Based on the direction of the flow of current in the winding layers 320, 330, 340, and 350, the direction of flux in the four core legs 311-314 is also shown in FIG. 4, where an "X" designates flux into the page, and a black circle designates flux out of the page.

Each elemental transformer in the integrated matrix transformer 300 has a 2:1 turns ratio. One secondary A turn, one secondary B turn, and two primary turns extend or wrap around each transformer core leg 311-314. The number of primary or secondary turns can be reduced or increased according to the desired turns ratio. In FIG. 4, the direction of current is shown using arrows over the winding layers 320, 330, 340, and 350. For example, FIG. 4 shows current direction at the first half cycle, when secondary A is conducting current but secondary B is not conducting. Certain windings on different layers among the winding layers 320, 330, 340, and 350 can be electrically coupled to each other using vias if needed. For example, current can be passed between the primary windings in the winding layers 330 and 340 using the vias 360. FIG. 4 shows four-layer windings as an example. More layers can be used for a greater number of turns in other examples.

Both primary and secondary windings extend around the core legs 311-314, to realize the elemental transformers of the integrated matrix transformer 300. For the primary layers, turns 333 and 343 wrap clockwise (CW) around the third core leg 313 starting on the second layer 330, then continue on the third layer 340 to the fourth core leg 314. The winding continues around the fourth core leg 314 counter-clockwise (CCW) for turns 344 and 334 returning to the second layer 330. Continuing on the second layer 330 to the second core leg 312, turns 332 and 342 wrap CW around the second core leg 312, then continue on the third layer 340 to the first core leg 311. The primary winding is completed with turns 341 and 331 extending CCW around first core leg 311, returning to the second layer 330.

For the secondary layers, the secondary layer 320 includes turns 321-324. Current flows in the turns 321-324 in the direction of the arrows shown in FIG. 4. The turns 351-354 of the secondary layer 350 are not active for the first half-cycle, although current flows from the side of the SR to the side of the capacitor in each of the turns 351-354. In one example, the turn 321 of the secondary layer 320 can be relied upon for the S1 winding of the power converter 220 shown in FIG. 1, and the turn 351 of the secondary layer 350 can be relied upon for the S2 winding of the power converter 220 shown in FIG. 1. The turn 322 of the secondary layer 320 can be relied upon for the S3 winding of the power converter 220, and the turn 352 of the secondary layer 350 can be relied upon for the S4 winding of the power converter 220. The turn 323 of the secondary layer 320 can be relied upon for the S5 winding of the power converter 220, and the turn 353 of the secondary layer 350 can be relied upon for the S6 winding of the power converter 220. Finally, the turn 324 of the secondary layer 320 can be relied upon for the S7 winding of the power converter 220, and the turn 354 of the secondary layer 350 can be relied upon for the S8 winding of the power converter 220. However, in other examples, each of the turns 321-324 can be relied upon for another one of the windings S1, S3, S5, and S7, and each of the turns 351-354 can be relied upon for another one of the windings S2, S4, S6, and S8.

As shown in FIG. 4, the winding layers 320, 330, 340, and 350 do not wrap around or direct current to flow around the center core leg 315 in any particular direction (e.g., CW or CCW). Thus, the center core leg 315 has no windings. The secondary layers 320 and 350 also include contacts for the center taps on the secondary side of the integrated matrix transformer 300. One center tap 370 is identified for the winding 353 in FIG. 4

Figure 5:
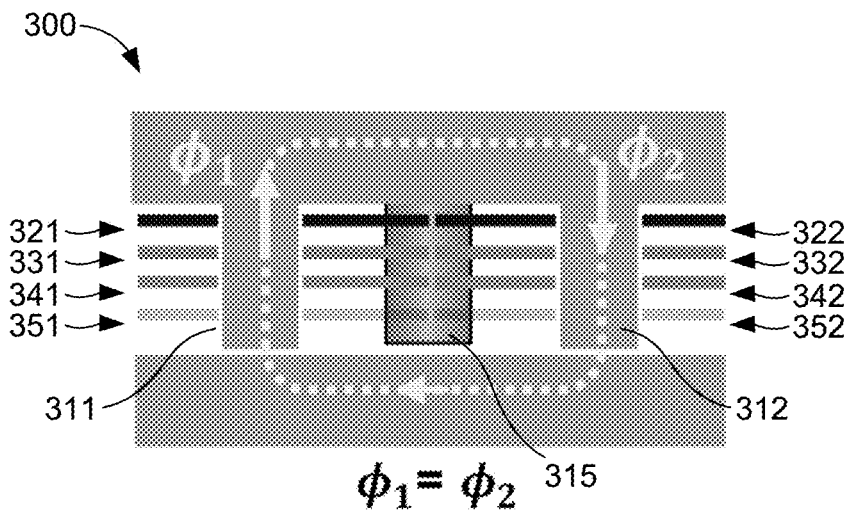
FIG. 5 illustrates a side view and flux distribution for the winding arrangement shown in FIG. 4 with the core structure of FIG. 3 according to various embodiments described herein.

FIG. 5 illustrates a side view and flux distribution for the winding arrangement shown in FIG. 4 with the core structure of FIG. 3 according to various embodiments described herein. The flux through core leg 311 and core leg 312 is $\Phi_1 = \Phi_2$. The symmetry in windings around the core legs 311-314 results in symmetry in the flux in the four core legs. It also results in minimal flux going through the center core leg 315. The winding arrangement shows a case with minimal (or nearly zero) leakage inductance or leakage flux in the center core leg 315. In this winding arrangement, the windings wrapped around each of the core legs 311-314 are analogous to each other. That is, each of the core legs 311-314 has the same number of secondary A winding turns 321-324, secondary B winding turns 351-354, and primary winding turns 331-334 and 341-344. The flux in core legs 311-314 is also the same or nearly the same, such that $\Phi_1 = \Phi_2 = \Phi_3 = \Phi_4$, and this leads to the circulation of flux between the core legs 311-314, with no flux go through the leakage core leg 315. The resulting leakage inductance on the primary and secondary sides is very small and created only due to leakage flux escaping to air. This arrangement can be applied to center-tap transformers or transformers with single secondary outputs.

Figure 6:
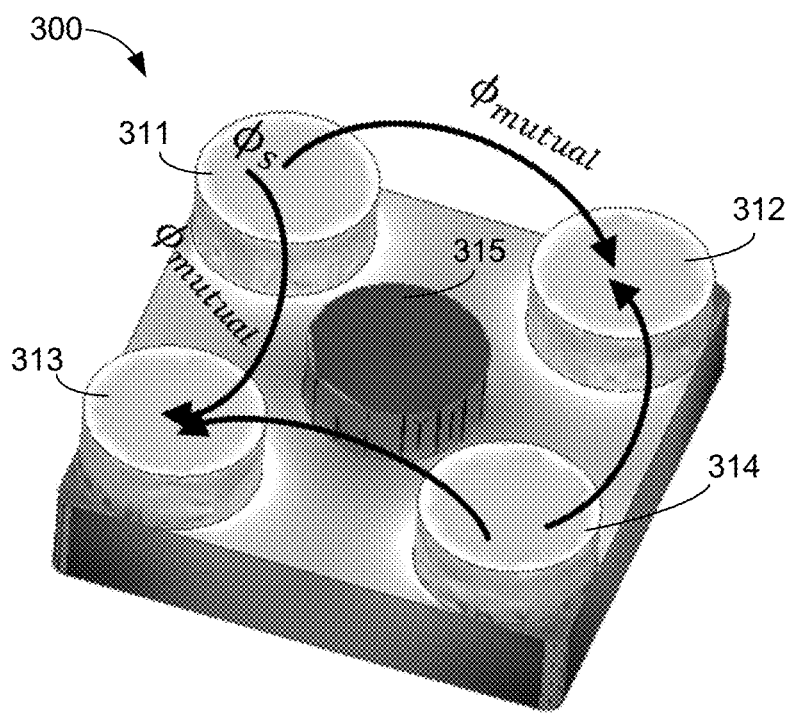
FIG. 6 illustrates a finite element simulation of the flux distribution for the winding arrangement shown in FIGS. 4 and 5 according to various embodiments described herein.

Turning to FIG. 6, the flux distribution for the example core structure of the integrated matrix transformer 300 shown in FIGS. 4-5 is shown. The mutual flux is shown in solid lines. The shading corresponds to the magnetic flux density B in Tesla, ranging from darker at 0.00 Tesla to lighter at 0.06 Tesla. As shown in FIG. 6, the configuration shown in FIGS. 4 and 5 has very small leakage inductance and does not show leakage flux passing through the center leg.

Figure 7:
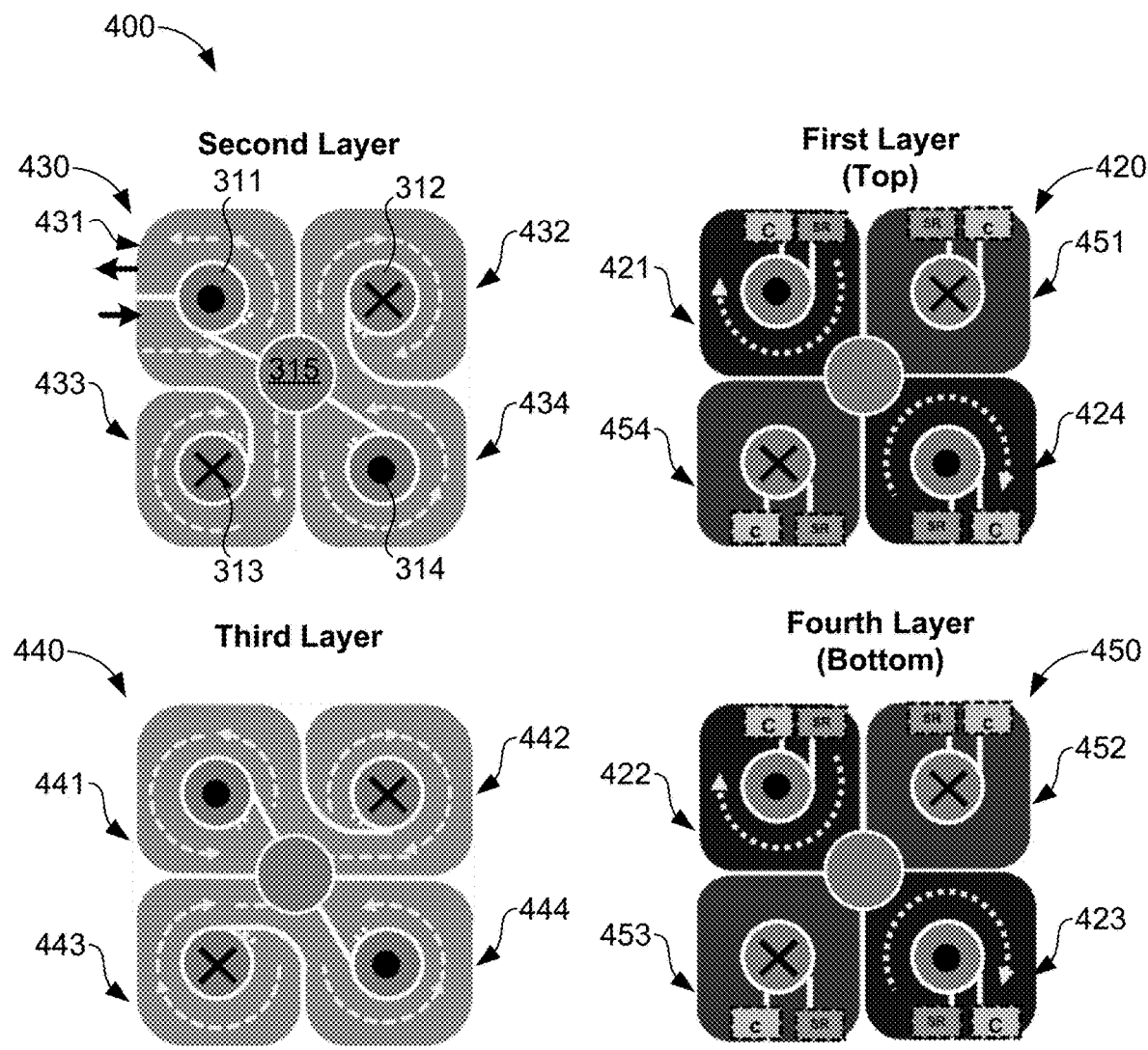
FIG. 7 illustrates an example winding arrangement according to various embodiments described herein.
Figure 8:
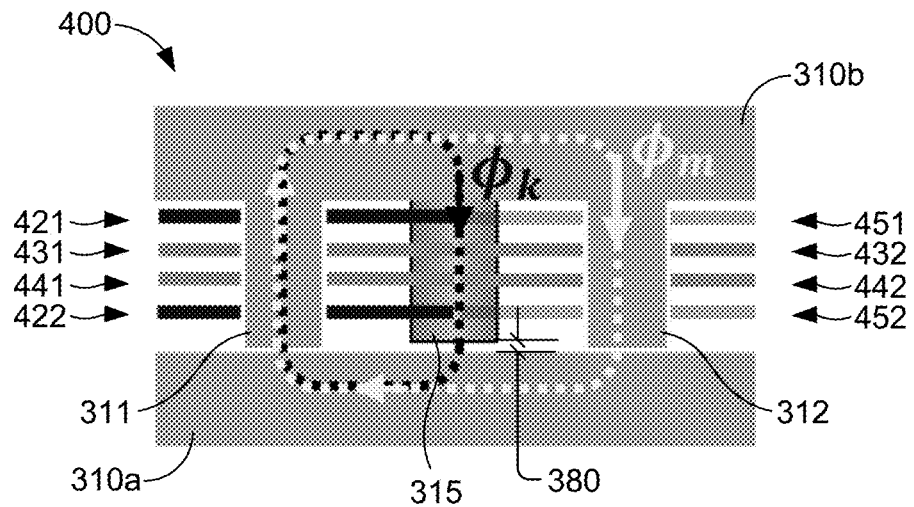
FIG. 8 illustrates a side view and flux distribution for the winding arrangement shown in FIG. 7 with the core structure of FIG. 3 according to various embodiments described herein.

In a different example, a matrix transformer 400 can be arranged by using the same magnetic core structure shown in FIG. 3, but rearranging the planar winding structure with layers 420-450 as in FIGS. 7 and 8. The primary winding and secondary windings maintain the same number of turns, but are rearranged to create leakage flux in the center leg by breaking the symmetry in the windings between the four transformers. In the matrix transformer 400, the secondary winding is relocated without making any change on the primary winding. Secondary A is active for first half cycle and secondary B is active for the second half cycle. This causes leakage flux $\Phi_k$ to pass through the center core leg 315. By relocating the secondary winding, leakage inductance can be realized on the secondary side of the matrix transformer 400. This way, the winding structure of the matrix transformer 400 can be used as part of a three element CLL resonant circuit. Different combinations of winding arrangements will result in different leakage inductance values in both the primary and secondary sides.

FIG. 7 shows the winding arrangement for the matrix transformer 400, including a magnetic core having four core legs 311-314, as shown in FIG. 3. Each elemental transformer in the matrix transformer 400 has a 2:1 turns ratio. The implementation of the primary winding in layers 430 and 440 of FIG. 7 is the same as in the matrix transformer 300 shown in FIG. 4 in layers 330 and 340. The change is only made to the secondary windings. In this example, the secondary A windings or turns 451-454 are arranged around the two core legs 311 and 314, and the secondary B windings or turns 421-424 are placed on the other two core legs 312 and 313. The secondary windings are still realized or embodied on the top layer 420 and the bottom layer 450 and include direct connections or contacts for the SRs and capacitors.

FIG. 8 illustrates a side view and flux distribution for the winding arrangement shown in FIG. 7 with the core structure of FIG. 3 according to various embodiments described herein. This winding arrangement shows a case with leakage inductance or leakage flux in the center core leg 315. An air gap 380 is identified for the center core leg 315, between the first portion 310a and the second portion 310b of the magnetic core.

In this winding arrangement, the winding wrapped around any two core legs is different from the windings around the other two transformer legs. For example, core legs 311 and 314 have two secondary A turns and two primary turns. Core legs 312 and 313 have two secondary B turns and two primary turns. During the first half cycle, secondary A is conducting current and secondary B is not conducting current. The coupling between the secondary A turns on core legs 311 and 314 and the primary turns on core legs 312 and 313 is weak because of the presence of the center core leg 315. This configuration increases the leakage associated with the windings, and the leakage inductance increases.

Figure 9:
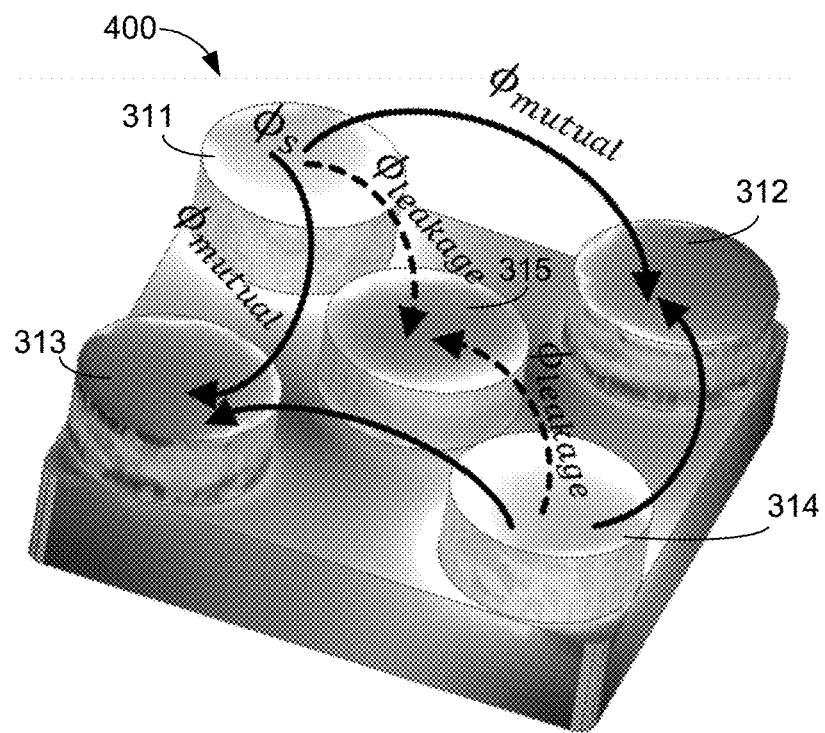
FIG. 9 illustrates a finite element simulation of the flux distribution for the winding arrangement shown in FIGS. 7 and 8 according to various embodiments described herein.

Turning to FIG. 9, the flux distribution for the example core structure of the matrix transformer 400 is shown. The mutual flux is shown in solid lines, and the leakage flux is shown in dashed lines. The shading corresponds to the magnetic flux density B in Tesla, ranging from darker at 0.00 Tesla to lighter at 0.06 Tesla. As shown in FIG. 9, the winding configuration shown in FIGS. 7 and 8 has controllable leakage flux passing through the center or leakage core leg 315. The winding arrangement, air gap 380 (FIG. 8), and cross-sectional area of the leakage core leg 315 are all factors of an control the amount of leakage inductance in the matrix transformer 400.

Figure 10:
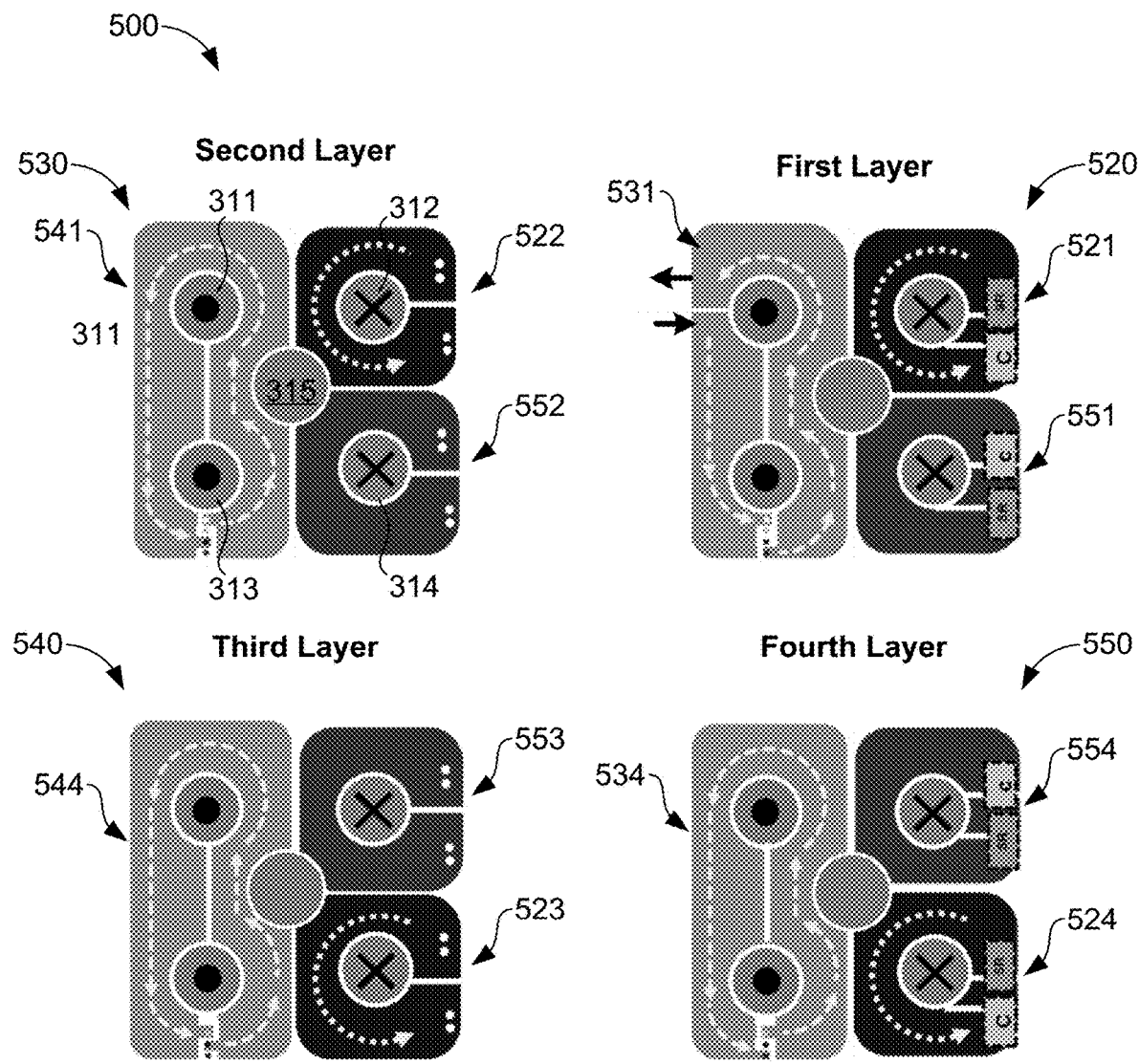
FIG. 10 illustrates an example winding arrangement according to various embodiments described herein.

Next, FIG. 10 shows another example of a matrix transformer 500, showing the PCB winding implementation of another winding arrangement. Again, the five-leg magnetic core is used, with the planar winding structure illustrated in FIG. 10. The primary winding extends around the two transformer core legs 311 and 313, and the secondary windings extend around the other two transformers core legs 312 and 314. The primary winding begins at the first layer 520, with a CCW turn 531 from the first core leg 311 to the second core leg 313, through a via to the second layer 530. The primary winding continues with a CCW turn 541 around the first core leg 311 to the second core leg 313, then through a via to the third layer 540. The primary winding continues with a CCW turn 544 around the first core leg 311 to the second core leg 313, then through a via to the fourth layer 540. The primary winding concludes with a CCW turn 534 around the first core leg 311 to the second core leg 313, then through a via returning to the first layer 520.

The secondary windings extend around the transformers core legs 312 and 314. The secondary A includes turns 522 and 521, winding CCW around second core leg 312, and turns 523 and 524, winding CCW around core leg 314 in the third and fourth layers 540 and 550. The secondary B includes turns 552 and 551, winding CW around second core leg 314, and turns 553 and 554, winding CW around core leg 312 in the third and fourth layers 540 and 550. In this winding arrangement, the secondary windings on the second and third layers 530 and 540 are connected to the secondary windings on the first and fourth layers 520 and 550, respectively, using vias. This configuration increases the leakage of the primary and secondary winding.

The winding arrangement shown in FIG. 10 provides a case with leakage inductance or leakage flux $\Phi_k$ in the center core leg 315. In this winding arrangement, the primary winding is placed on only the two transformer core legs 311 and 313. The secondary windings are placed on the other two core legs 312 and 314. In this example, core legs 312 and 314 have both secondary A and secondary B windings. This arrangement weakens the coupling between the primary and secondary windings and increases the leakage inductance of the matrix transformer 500. This arrangement can be applied to a center-tap transformer or a transformer with single secondary output.

Figure 11:
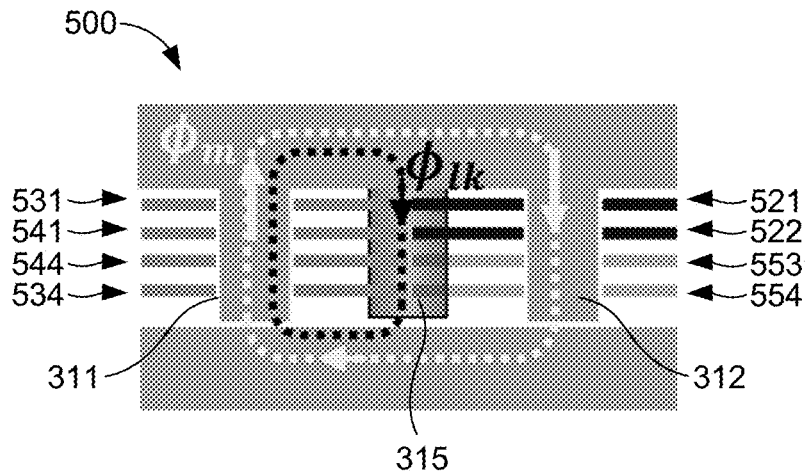
FIG. 11 illustrates a side view and flux distribution for the winding arrangement shown in FIG. 10 with the core structure of FIG. 3 according to various embodiments described herein.

FIG. 11 illustrates a side view and flux distribution for the winding arrangement shown in FIG. 10 with the core structure of FIG. 3 according to various embodiments described herein. This winding arrangement shows a case with leakage inductance or leakage flux in the center core leg 315.

Figure 12:
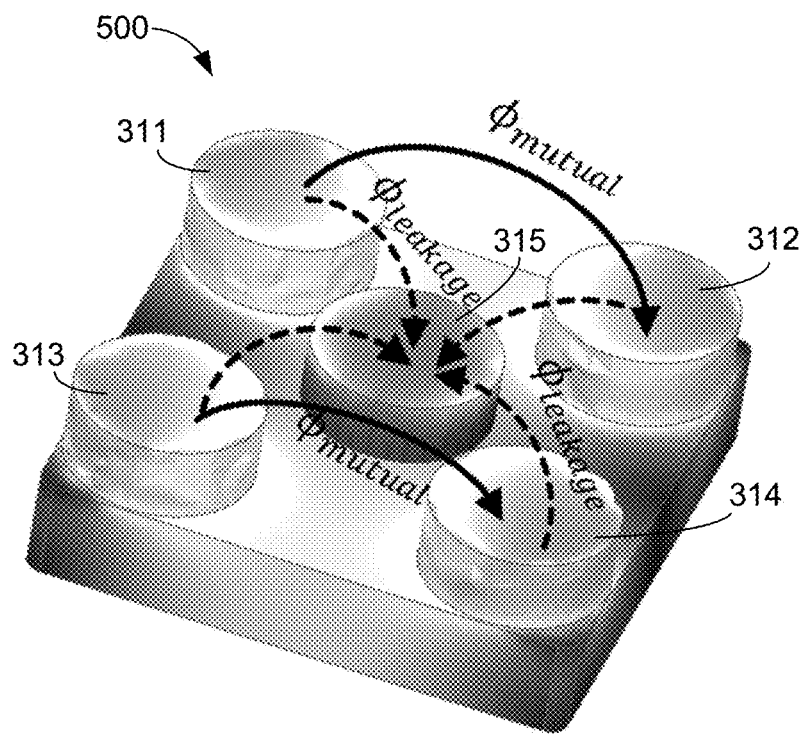
FIG. 12 illustrates a finite element simulation of the flux distribution for the winding arrangement shown in FIGS. 10 and 11 according to various embodiments described herein.

Turning to FIG. 12, the flux distribution for the example core structure of the matrix transformer 500 is shown. The mutual flux is shown in solid lines, and the leakage flux is shown in dashed lines. The shading corresponds to the magnetic flux density B in Tesla, ranging from darker at 0.00 Tesla to lighter at 0.06 Tesla. As shown in FIG. 12, the winding configuration shown in FIGS. 10 and 11 has controllable leakage flux passing through the center core leg 315. The winding arrangement, air gap 380 (FIG. 8), and cross-sectional area of the leakage core leg 315 are all factors of an control the amount of leakage inductance in the matrix transformer 500.

In additional examples, not shown, the primary winding can also be wrapped diagonally on the core leg 311 and on the core leg 314 (or on the core leg 312 and on the core leg 313). The secondary winding can be placed or wrapped around the core leg 312 and the core leg 313 (or the core leg 311 and the core leg 314, respectively) where each core leg has two turns of secondary A and two turns of secondary B. In this winding arrangement, similar to the arrangement in the matrix transformer 500, the secondary windings on the second and third layers are connected to the secondary windings on the first and fourth layers respectively, using vias.

Figure 13A:
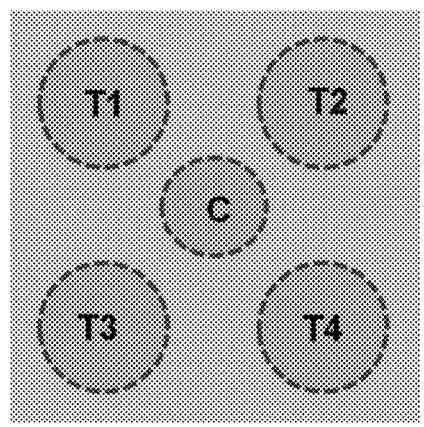
FIGS. 13A-C illustrate alternate examples of configurations of the center core according to various embodiments described herein.
Figure 13B:
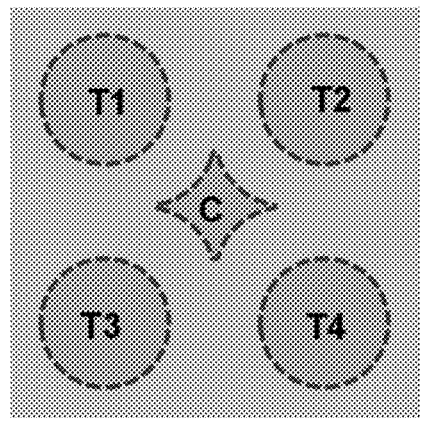
Figure 13C:
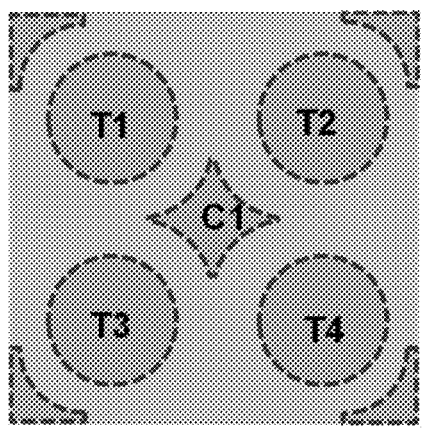

While the center core leg 315 is illustrated as circular or cylindrical in the examples, other shapes can be integrated. FIGS. 13A-13C show different possible ways to implement a center core leg. FIG. 13A illustrates a five-leg magnetic core with a center core leg "C" having a round shape at the middle between four core legs T1, T2, T2, and T4. In variations, the center core leg can take any kind of shape and be placed or positioned at any suitable location where no winding wraps or extends around it. The primary and secondary windings only wrap around the four transformer legs T1, T2, T2, and T4 in the example shown in FIG. 13A.

In another example, FIG. 13B shows a center core leg "C" in a star shape. The shape of the center core leg impacts the flux distribution in the core and impacts the core loss. Moreover, multiple center legs (Leakage legs) can be used instead of using one center leg. In FIG. 13C, a distributed leakage leg where the leakage flux can pass through multiple legs is shown. FIG. 13C shows a center core leg "C1" in a star shape, along with rounded corners at the corners of the magnetic core.

Figure 14A:
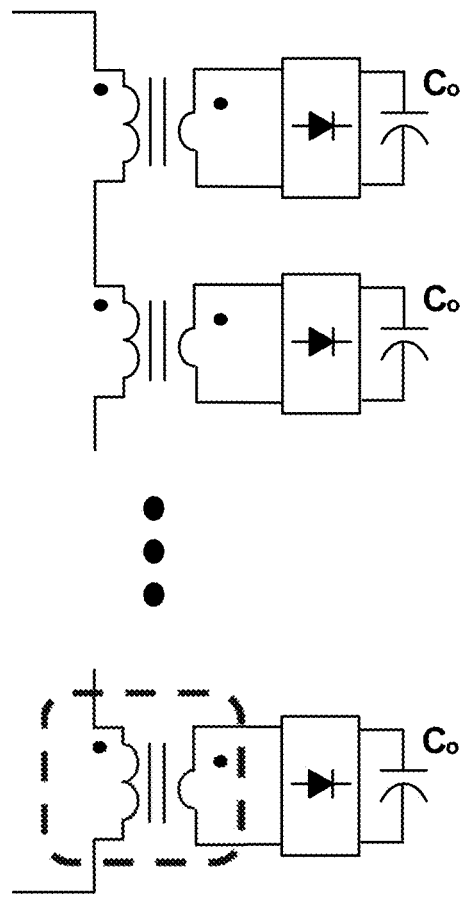
FIGS. 14A-14C illustrate an example of scaling elemental transformers and alternate configurations according to various embodiments described herein.
Figure 14B:
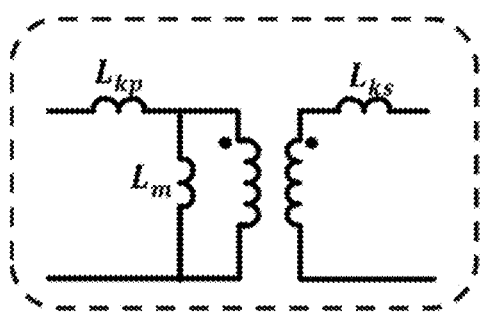
Figure 14C:
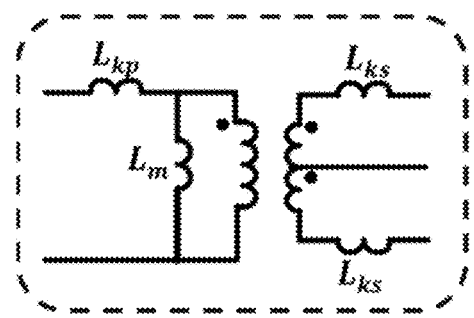

In considering leakage inductance, the number of secondary phase legs of the power converter 220 shown in FIG. 2 can be expanded and scaled as needed for the specific application. In FIG. 14A, a schematic is shown with a matrix transformer integrated with controllable leakage inductance. The matrix has multiple cells, which are elemental transformers. In one example, each elemental transformer can have single secondary winding as shown in FIG. 14B. In another example, each elemental transformer can have a center-tap secondary winding, as shown in FIG. 14C. Each transformer has a magnetizing inductance $L_m$, a primary winding leakage inductance $L_{kp}$, and a secondary winding leakage inductance $L_{ks}$. In resonant converters, a finite amount of inductance is needed to be connected in series with the primary and secondary windings. The matrix transformers described herein utilize the leakage inductance of the transformers described herein for such purpose.

Figure 15:
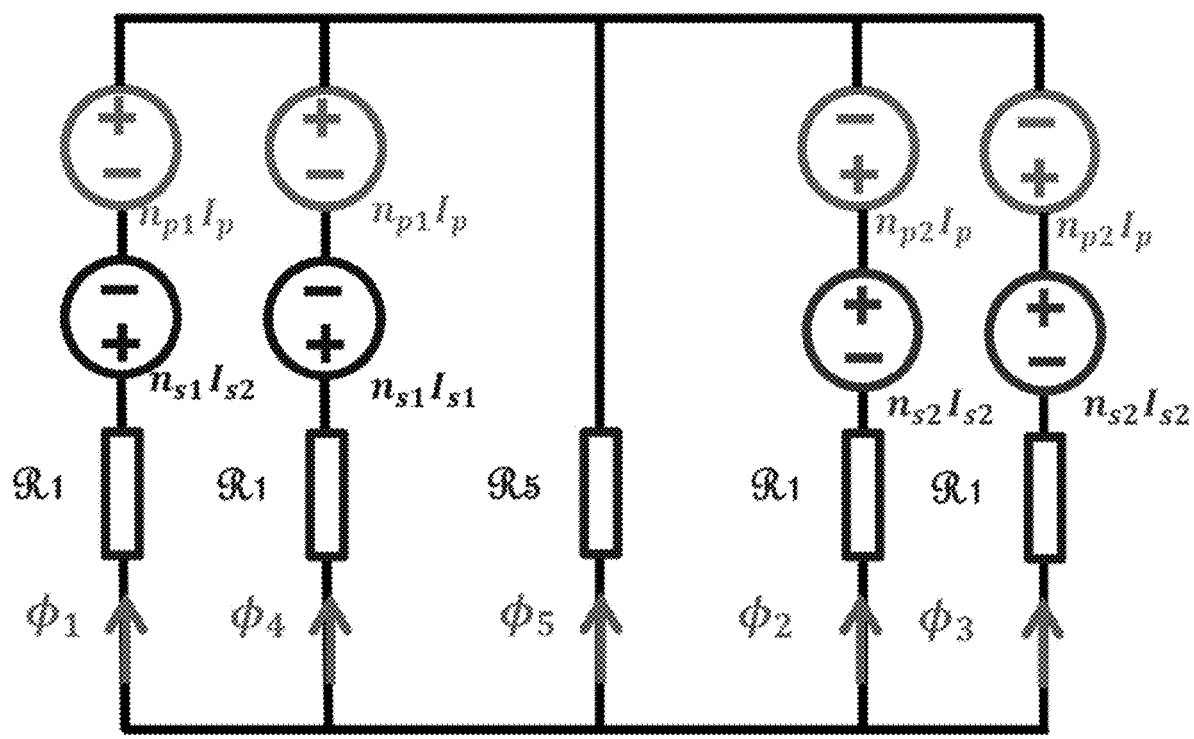
FIG. 15 illustrates a generalized reluctance model for a 5-leg transformer according to various embodiments described herein.

Moreover, the magnetizing and leakage inductance values can be derived using the reluctance model of the proposed five-leg structure as shown in FIG. 15. For the example circuit, the primary winding on the four transformer legs are identical ($n_{p1}=n_{p2}=n_{p3}=n_{p4}=n$). The secondary winding is also identical for legs 1 and 2 ($n_{s1}=n_{s4}=0.5$) and for legs 2 and 3 ($n_{s2}=n_{s3}=0.5$). Also, the reluctance of the four transformer legs are the same ($R_1=R_2=R_3=R_4=R_m$), and the reluctance of the center leg is $R_5=R_k$. In this example transformer with identical series primary winding and identical reluctance for the four transformer legs, the magnetizing inductance is the sum of magnetizing inductance for the four transformers as follows:

$$L_m = 4 \times \frac{n^2}{\mathcal{R}_m}. \tag{1}$$

The secondary side leakage inductance can be also calculated as function of the reluctance of center leg and transformer leg as follows:

$$L_{ks} = \frac{1}{4\mathcal{R}_m + 16\mathcal{R}_k}. \tag{2}$$

The ratio between the magnetizing inductance and the reflected leakage to the primary side is also important to determine the DC c/c of the resonant circuit. This ratio ($L_n$) can be determined by controlling the ratio between the reluctance of the center leg and the reluctance of the transformer leg. This ratio is calculated as follows:

$$L_n = \frac{L_m}{(4n)^2 \times L_{k_s}} = \left(1 + 4\frac{\mathfrak{R}_k}{\mathfrak{R}_m}\right). \quad (3)$$

The proposed magnetic structures integrate a matrix transformer with controllable leakage inductance. The leakage inductance is created on the secondary side of the transformer as seen in Equation (2). The magnetic structure can be utilized in a resonant circuit, where the secondary side inductor is connected series to the load, and the primary side is connected in series with a resonant capacitor, as shown in FIG. 15. In this circuit, the secondary leakage inductance is utilized as a series resonant inductor, and the magnetizing inductance is utilized as parallel resonant inductor. This resonant tank is called CLL resonant tank and has very similar characteristics as the well established LLC converter. The resonant frequency in CLL is calculated as:

$$f_0 = \frac{1}{2\pi\sqrt{\frac{(4n)^2 L_{k_s} L_m}{L_m + (4n)^2 L_{k_s}} C}}. \quad (4)$$

This circuit also features a gain higher than 1 at resonant frequency, and this gain can be controlled by controlling the $L_n$ value. The proposed structure integrates the transformer, parallel resonant inductor, and series resonant inductor in one magnetic entity.

Figure 16A:
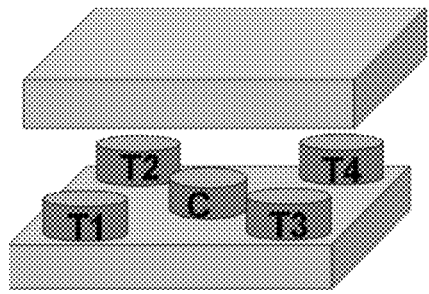
FIG. 16A-16C illustrate example configurations for scaling the number of transformers in a core according to various embodiments described herein.
Figure 16B:
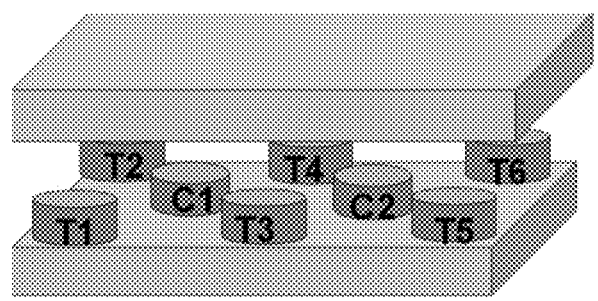
Figure 16C:
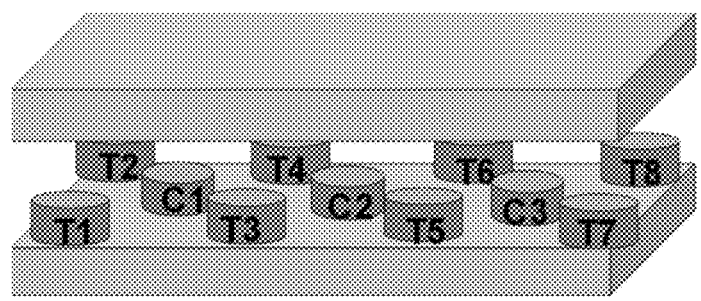

While a five-leg core is shown in the examples, the concepts can be scaled to multiple transformers. Center legs can be placed between any number of transformers to enhance the leakage flux between the primary and secondary windings. FIGS. 16A-16C illustrate examples of 4 different transformers (FIG. 16A), 6 transformers (FIG. 16B), and 8 transformers (FIG. 16C). The center legs can take any shape and number and placed in proximity of the transformer windings.

As a summary, the magnetic integration of matrix transformer with high controllable leakage inductance described integrates a matrix of four transformers with high controllable leakage inductance in a condensed five-leg core footprint, scalable to a multiple number legs of elemental transformers. The magnetic structure helps to reduce the size of the magnetics used in DC-DC converters and achieve high power density. The invention can be applied in many applications such as datacenter and server power supplies, EV chargers and PV systems.

The above-described examples of the present disclosure are merely possible examples of implementations set forth for a clear understanding of the principles of the disclosure. Many variations and modifications can be made without departing substantially from the spirit and principles of the disclosure. All such modifications and variations are intended to be included herein within the scope of this disclosure and protected by the following claims.

Therefore, the following is claimed:

1. A transformer, comprising:
   a magnetic core comprising:
      a plurality of core legs, and
      a leakage core leg, the leakage core leg being positioned among the plurality of core legs to control a leakage inductance of the transformer, the leakage core leg located between at least two of the plurality of core legs; and
   a planar winding structure comprising a primary winding and a plurality of secondary windings, the primary winding extending in a number of turns around the plurality of core legs without a turn around the leakage core leg, the plurality of secondary windings divided into a first set of secondary windings and a second set of secondary windings, the first set of secondary windings having turns arranged around a first set of non-adjacent core legs of the plurality of core legs, the second set of secondary windings having turns arranged around a second set of non-adjacent core legs different from the first set of non-adjacent core legs, wherein the turns of the primary winding and the plurality of secondary windings are arranged to create a leakage flux in the leakage core leg to further control the leakage inductance of the transformer.

2. The transformer of claim 1, wherein:
   the planar winding structure comprises a four-layer winding structure; and
   the four-layer winding structure comprises two primary winding layers for the primary winding and two secondary winding layers for the plurality of secondary windings.

3. The transformer of claim 2, wherein the two primary winding layers are positioned between the two secondary winding layers in the four-layer winding structure.

4. The transformer of claim 2, wherein the plurality of secondary windings comprise a first set of secondary windings which conduct current during a first half-cycle, and a second set of secondary windings which conduct current during a second half-cycle.

5. The transformer of claim 4, wherein: the first set of secondary windings of the plurality of secondary windings is located on one of the two secondary winding layers;
   the second set of secondary windings of the plurality of secondary windings is located on another one of the two secondary winding layers; and
   the two primary winding layers are positioned between the two secondary winding layers in the four-layer winding structure.

6. The transformer of claim 4, wherein:
   at least a portion of the first set of secondary windings and a portion of the second set of secondary windings of the plurality of secondary windings is located on each of the two secondary winding layers; and
   the two primary winding layers are positioned between the two secondary winding layers in the four-layer winding structure.

7. The transformer of claim 2, wherein:
   at least a portion of the primary winding is located on each layer of the four-layer winding structure; and
   at least a portion of the plurality of secondary windings is located on each layer of the four-layer winding structure.

8. The transformer of claim 1, wherein the primary winding turns around adjacent ones of the plurality of core legs in opposite directions.

9. The transformer of claim 1, wherein the turns of the primary winding and one winding of the plurality of secondary windings that is around one of the plurality of core legs comprises a first elemental transformer.

10. The transformer of claim 1, wherein the primary winding and the plurality of secondary windings are arranged on the transformer to control the leakage inductance of the transformer through the leakage core leg.

11. The transformer of claim 1, wherein a cross-sectional shape of the at least one leakage leg is different than a cross-sectional shape of the plurality of core legs.

12. The transformer of claim 1, wherein the leakage leg is positioned at a central location among the plurality of core legs in the magnetic core.

13. The transformer of claim 1, wherein the planar winding structure comprises no windings around the leakage core leg.

14. A power converter, comprising:
a matrix transformer, comprising:
a magnetic core comprising:
a plurality of core legs, and
a leakage core leg, the leakage core leg being positioned among the plurality of core legs to control a leakage inductance of the matrix transformer, the leakage core leg between at least two of the plurality of core legs; and
a planar winding structure comprising a primary winding and a plurality of secondary windings, the primary winding extending in a number of turns around the plurality of core legs without a turn around the leakage core leg, the plurality of secondary windings divided into a first set of secondary windings and a second set of secondary windings, the first set of secondary windings having turns arranged around a first set of non-adjacent core legs of the plurality of core legs, the second set of secondary windings having turns arranged around a second set of non-adjacent core legs different from the first set, wherein the turns of the primary winding and the plurality of secondary windings are arranged to create a leakage flux in the leakage core leg to further control the leakage inductance of the matrix transformer; and
a resonant circuit comprising a primary side and a secondary side, the primary side comprising the primary winding of the matrix transformer and the secondary side comprising the plurality of secondary windings of the matrix transformer, wherein the leakage inductance is incorporated into the resonant circuit of at least one of the primary side or the secondary side.

15. The power converter of claim 14, wherein:
the planar winding structure comprises a four-layer winding structure; and
the four-layer winding structure comprises two primary winding layers for the primary winding and two secondary winding layers for the plurality of secondary windings.

16. The power converter of claim 15, wherein the two primary winding layers are positioned between the two secondary winding layers in the four-layer winding structure.

17. The power converter of claim 15, wherein the plurality of secondary windings comprise a first set of secondary windings which conduct current during a first half-cycle, and a second set of secondary windings which conduct current during a second half-cycle.

18. The power converter of claim 17, wherein:
the first set of secondary windings of the plurality of secondary windings is located on one of the two secondary winding layers;
the second set of secondary windings of the plurality of secondary windings is located on another one of the two secondary winding layers; and
the two primary winding layers are positioned between the two secondary winding layers in the four-layer winding structure.

19. The power converter of claim 17, wherein:
at least a portion of the first set of secondary windings and a portion of the second set of secondary windings of the plurality of secondary windings is located on each of the two secondary winding layers; and
the two primary winding layers are positioned between the two secondary winding layers in the four-layer winding structure.

20. The power converter of claim 15, wherein:
at least a portion of the primary winding is located on each layer of the four-layer winding structure; and
at least a portion of the plurality of secondary windings is located on each layer of the four-layer winding structure.

* * * * *